April 9, 1968
J. R. BARNES
3,376,771
TOOL POST AND HOLDER ASSEMBLY
Filed Feb. 4, 1966
3 Sheets-Sheet 1
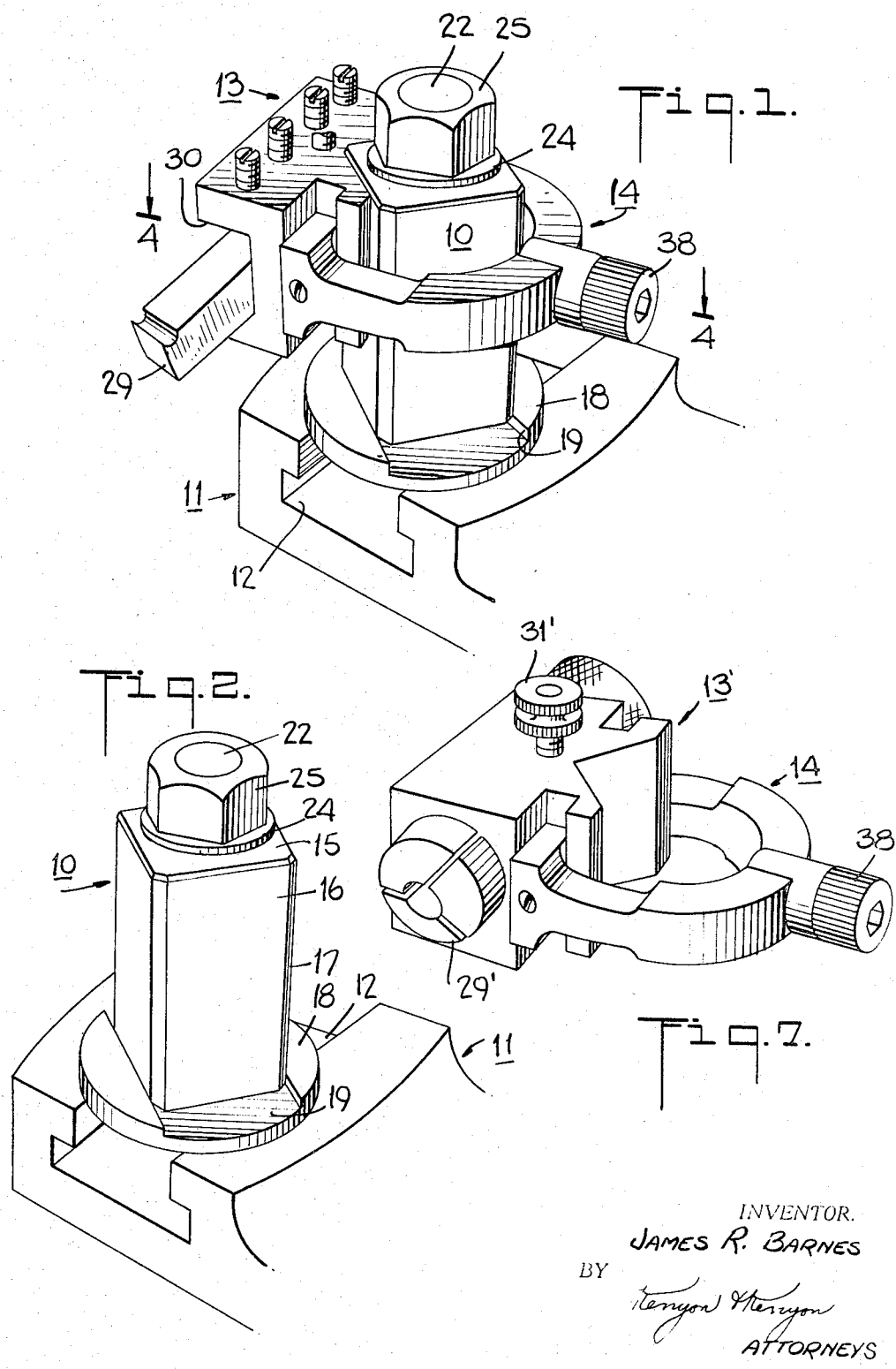
INVENTOR.
JAMES R. BARNES
BY
Kenyon & Kenyon
ATTORNEYS

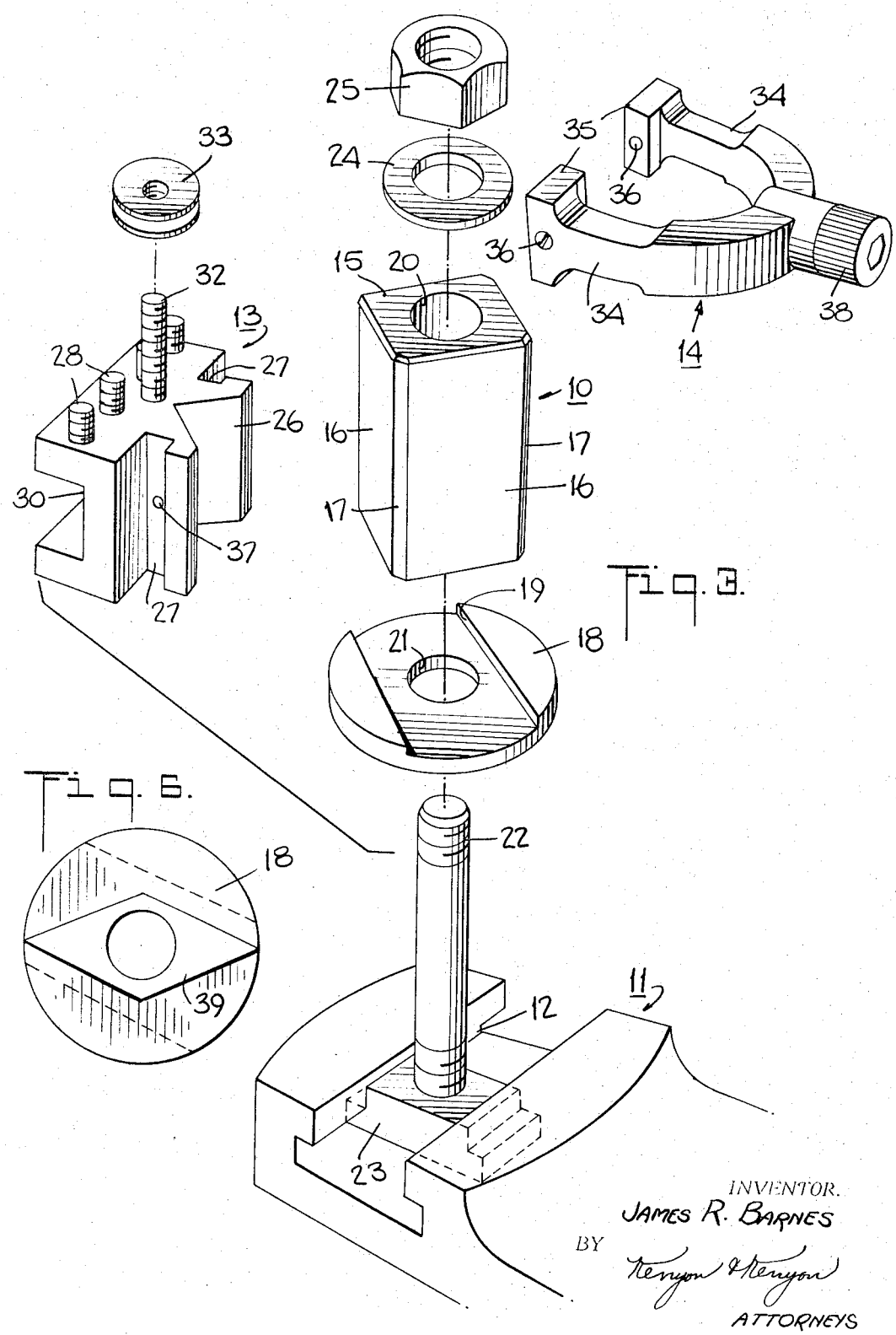

April 9, 1968  J. R. BARNES  3,376,771
TOOL POST AND HOLDER ASSEMBLY
Filed Feb. 4, 1966  3 Sheets-Sheet 3

INVENTOR.
JAMES R. BARNES
BY Kenyon & Kenyon
ATTORNEYS

United States Patent Office 3,376,771
Patented Apr. 9, 1968

3,376,771
TOOL POST AND HOLDER ASSEMBLY
James R. Barnes, Bergen Hill Road, R.F.D. 1,
Rockaway, N.J. 07866
Filed Feb. 4, 1966, Ser. No. 525,012
4 Claims. (Cl. 82—36)

ABSTRACT OF THE DISCLOSURE

The tool post is of one piece block construction while the tool holder is secured against the tool post by means of a U-shaped clamp. The clamp has a pair of legs which fit into grooves of a tool holder as well as spring biased pins which project into corresponding depressions in the tool holder for holding the tool holder during placement on the post.

---

This invention relates to a tool post and holder assembly for lathes and similar structures. More particularly, this invention relates to a tool post and holder assembly which is adapted to carry various types of tools in desired relation to a workpiece being formed on a lathe or similar structure.

There are a number of tool posts and holders on the market; however, many of these are complex in construction and are liimted to holding only certain types of tools, still others require cumbersome locking aranrgements for securing a tool in position. Further, others can only develop a relatively small degree of clamping force between the holder and post.

It is an object of this invention to provide a tool post and holder assembly which is simple in construction.

It is another object of this invention to provide a tool post and holder assembly which is rugged and versatile.

It is another object of this invention to provide a tool post and holder assembly which utilizes a V-block-type clamp to secure the holder to the tool post.

It is another object of this invention to provide a tool post which is economical and adapted to carry many types of tool holders.

It is another object of this invention to provide a tool post and holder which can be secured together with relatively large clamping forces.

The invention provides a simple tool post of one-piece block construction formed with an internal bore for the reception of a securing means therethrough. The tool post has a series of longitudinal flat surfaces separated by flats which are arranged to form a plurality of V-shaped wedges. The tool holder provided by the invention has a V-shaped groove portion on one side which corresponds to a wedge of the tool post and which is adapted to mate therewith. The tool holder is secured to the tool post by a U-shaped clamp which has a pair of legs and a locking means disposed at the juncture of the legs. The legs of the clamp envelop the tool post and are each received in a suitable slot in the tool holder to either side of the V-shaped groove whereas, the locking means is abutted against one of the flats of the tool post and locked thereagainst to develop a clamping force with the mating V-shaped groove and wedge for securing the tool holder to the tool post.

The tool holder is also provided with any suitable means for securing a tool or standard collet therein on the side opposite the V-shaped groove. Further, the tool holder can be secured to the tool post at different relative mating positions. The tool post is also provided with a key which is adapted to fit a T-slot of a lathe compound and which is provided with parallel sides to allow a plurality of settings of the tool post with respect to the lathe compound.

Figure 4:
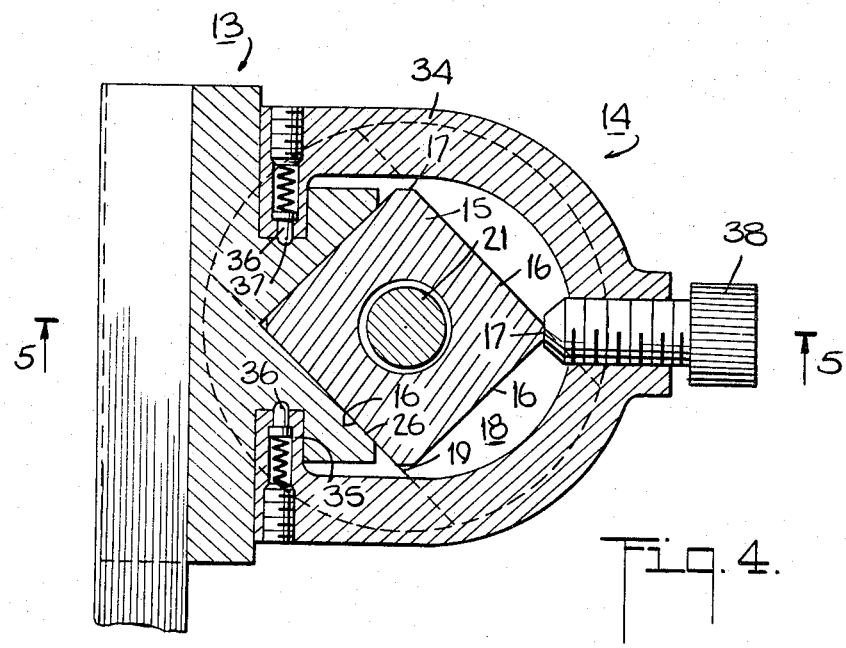
Figure 5:
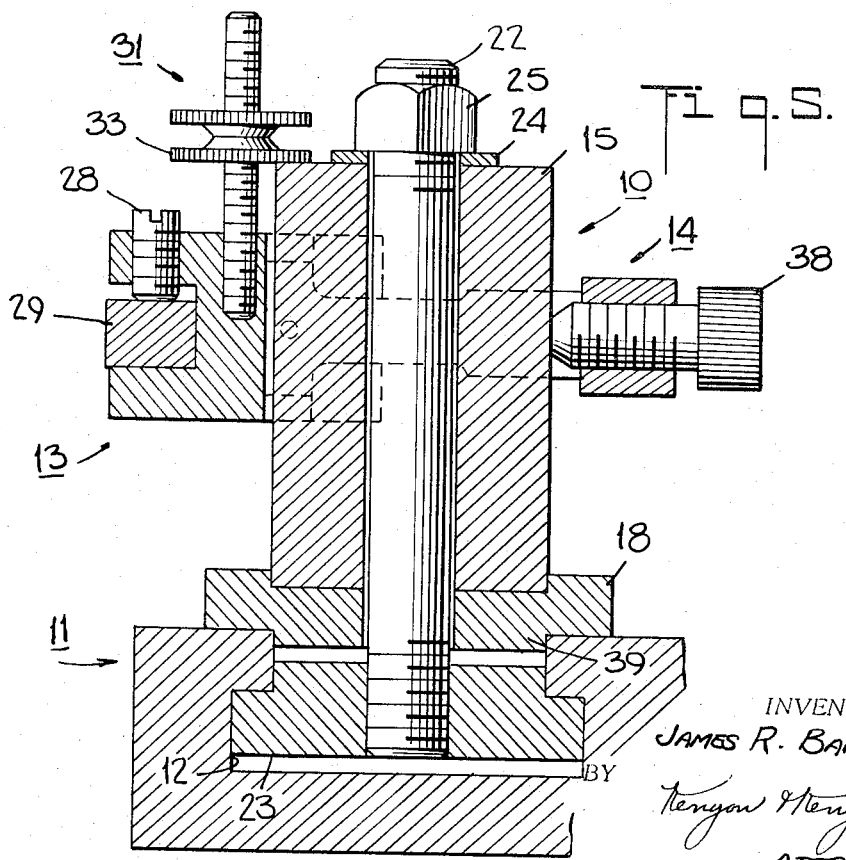

These and other objects and advantages will appear from the following detailed description and appended claims when taken in conjunction with the accompanying drawings in which:

FIG. 1 illustrates a perspective view of a tool post and holder assembly of the invention in situ;
FIG. 2 illustrates a perspective view of the tool post of FIG. 1;
FIG. 3 illustrates an exploded view of the tool holder of FIG. 1;
FIG. 4 illustrates a view taken at line 4—4 of FIG. 1;
FIG. 5 illustrates a view taken at line 5—5 of FIG. 4;
FIG. 6 illustrates a bottom view of the key at the base of the tool post; and
FIG. 7 illustrates another embodiment of the tool holder of the invention.

Referring to FIGS. 1 to 3, a tool post 10 is mounted on a lathe compound 11 having a T-slot 12 and a tool holder 13 is secured to the tool post 10 by a U-shaped clamp 14.

The tool post 10 is formed of a one-piece block construction 15 with a plurality of longitudinal flat surfaces 16, each adjacent pair of which surfaces being separated by a flat 17. For example, the block construction 15 is square shaped and each flat is machined at a forty-five degree angle with respect to the surfaces 16. Each adjacent pair of flat surfaces 16 is arranged to form a V-shaped wedge. Further, the tool post 10 has a base 18, for example, a round washer, which receives the block construction 15 in a slotted portion 19. Alternatively, the base 18 can be made integral with the block construction 15.

The block construction 15 has a longitudinal central bore 20 which passes therethrough and which is aligned with a corresponding bore 21 in the base 18. A threaded T-nut 23 slidably disposed in the T-slot 12 of the lathe compound 11 and a stem 22 consisting of a stud, threaded on each end, which passes upwardly through the base 18 and block construction 15. A suitable washer 24 and nut 25 assembly is threaded onto the T-nut assembly 22 and 23 so that upon tightening of the nut 25 the tool post 10 is secured in place on the lathe compound 11.

The tool holder 13 is formed on one side with a V-shaped groove 26 which corresponds to the V-shaped wedge formed by the surfaces 16 of the tool post 10. A longitudinal slotted groove 27 is formed on each side of the V-shaped groove 26 in a direction parallel thereto. A tool securing means, such as threaded screws 28, is provided on the opposite side of the holder 13 to secure a suitable tool 29, such as a tool bit, within a transverse slot 30 therein. Further, the tool holder 13 is provided with a vertical adjusting device 31, such as a set screw 32 and threaded head 33 assembly, which serves to position the tool holder 13 accurately on the tool post 10.

The U-shaped clamp 14 is provided with a pair of parallel legs 34 each of which has a foot 35 which anchors in one of the grooves 27 of the tool holder 13. Each foot 35 is also provided with a centrally located spring-activated pin 36 which projects towards the opposite foot and which is adapted to seat in a corresponding depression 37 in the groove 27 of the tool holder 13. The pins 36 serve to locate and hold the U-shaped clamp 14 in proper position on the tool holder 13 for ease of handling while positioning the tool holder on the tool post as well as while changing from one tool holder to another. The U-shaped clamp 14 is also provided with a centrally located locking means 38, for example, a threaded screw which passes through a threaded bore in the clamp 14, between the legs 34.

Referring to FIGS. 4 and 5, the tool holder 13 with a tool bit 29 therein is positioned around the tool post 10 with the walls of the V-shaped groove 26 mating with the surfaces 16 of the block construction 15 and is brought into the desired position by proper adjustment of the vertical adjusting device 31. As shown in FIG. 5, the threaded head of the vertical adjusting device abuts the top of the block construction 15 to arrest further downward movement of the tool holder with respect to the tool post. With the tool holder 13 in the desired position, the locking means 38 is threaded through the clamp 14 to engage one of the flats 17 of the tool post 10 until sufficient clamping force is exerted between the mating tool post surfaces 16 and tool holder groove walls and the locking means 38 and engaged flat 17 to maintain the holder 13 on the post 10.

Referring to FIGS. 5 and 6, the bottom of the base 18 is provided with a diamond-shaped key means 39 having a pair of parallel sides at twenty-two and a half degree angles from each other. The key 39 fits within the slot 12 of the lathe compound and is positioned with respect to the slot 19 in the topside of the base 18 so as to eliminate any possibility of error due to slippage, where a combination of accuracy and resistance to heavy work loads is required. For example, the axis of the slot 19 is in parallel relation to one pair of parallel sides of the key 39.

Referring finally to FIG. 7, the tool holder 13' can be modified to carry various types of collets 29'. Other types of collets can also be used which allow for a wide range of uses of the tool post for drilling, either with a straight shank Jacobs chuck or straight shank drills, or boring with any combination of boring bars, round bits and collets, limited only by the variety of tools and collets available.

Because of the shape of the tool post 10 and tool holder 13, the tool holder can be positioned at any mating position corresponding to the number of flats on the tool posts. In the embodiment described, the tool holder can be set at any of four positions relative to the tool posts. Furthermore, the tool post can be set at any of two positions corresponding to the parallel sides of the diamond-shaped key. The use of the mating V-shaped groove and wedge provides a structure which possesses strength as well as simplicity and versatility. Further, by positioning the locking means 38 on the opposite side of the block from the mating V-shaped surfaces, the lines of compressive force formed during engagement of the tool holder and tool post are directed directly through the body of the block construction thereby allowing relatively large clamping forces to be developed.

Having thus described the invention, it is not intended that it be so limited as changes may be readily made within the scope of the claims without departing from the invention. Accordingly, it is intended that all matter contained in the foregoing description or shown in the accompanying drawings shall be interpreted as illustrative and not in a limiting sense.

What is claimed is:

1. A tool post and holder assembly for a lathe compound comprising a tool post of one piece block construction having a plurality of adjacent flat surfaces thereon, said flat surfaces forming at least one V-shaped wedge, a tool holder having a V-shaped groove portion on one side thereof in mating engagement with said V-shaped wedge and a pair of longitudinal parallel grooves, each of said grooves being formed on each side of said V-shaped groove portion, and a U-shaped clamp having a pair of legs enveloping said tool post and received in said tool holder, each of said legs including a foot received in one of said longitudinal grooves, each foot including a spring activated pin projecting into a corresponding depression in each said longitudinal groove and a locking means disposed at the juncture of said legs for securing said tool holder to said tool post.

2. A tool post and holder assembly as set forth in claim 1 wherein said tool holder includes means for securing a tool therein.

3. A tool post and holder assembly as set forth in claim 1 wherein said locking means includes a threaded screw passing through a threaded bore in said clamp.

4. In combination with a tool holder having a V-shaped groove on one side thereof, a tool securing means on the opposite side thereof and a pair of longitudinal grooves, each of said longitudinal grooves being formed on each side of said V-shaped groove in parallel relation thereto, a U-shaped clamp having a pair of legs, each of said legs including a foot received in one of said longitudinal grooves, said foot including a spring activated pin projecting into a corresponding depression in each said longitudinal receiving groove and a locking means disposed at the juncture of said legs.

References Cited

UNITED STATES PATENTS

| 2,372,716 | 4/1945 | Evans | 82—37 XR |
| 2,428,508 | 10/1947 | Weigle et al. | 82—36 XR |
| 2,684,608 | 7/1954 | Roman | 82—37 XR |
| 3,183,746 | 5/1965 | Polanski | 82—36 |

FOREIGN PATENTS

| 1,000,881 | 10/1951 | France. |
| 1,042,342 | 10/1958 | Germany. |

LEONIDAS VLACHOS, *Primary Examiner.*